United States Patent [19]

Arfaei et al.

[11] Patent Number: 5,340,385
[45] Date of Patent: Aug. 23, 1994

[54] HYDRAULIC CEMENT SET-ACCELERATING ADMIXTURES INCORPORATING GLYCOLS

[75] Inventors: Ahmad Arfaei, Milford; Neal S. Berke; Ara A. Jeknavorian, both of Chelmsford, all of Mass.

[73] Assignee: W. R. Grace & Co.-Conn., New York, N.Y.

[21] Appl. No.: 46,110

[22] Filed: Apr. 9, 1993

Related U.S. Application Data

[63] Continuation of Ser. No. 827,196, Jan. 28, 1992, abandoned.

[51] Int. Cl.⁵ .......................... C04B 24/02; C04B 9/02
[52] U.S. Cl. ............................ 106/14.05; 106/14.14; 106/14.21; 106/14.44; 106/785; 106/819; 106/823
[58] Field of Search ............... 106/638, 666, 785, 764, 106/780, 819, 822, 823, 14.05, 14.14, 14.21, 14.44; C04B 24/02, 9/02

[56] References Cited

U.S. PATENT DOCUMENTS

| | | | |
|---|---|---|---|
| 1,998,667 | 4/1935 | Fritz et al. | 106/24 |
| 3,976,494 | 8/1976 | Kudo et al. | 106/14 |
| 4,089,696 | 5/1978 | Ray | 106/90 |
| 4,098,614 | 7/1978 | Ray | 106/90 |
| 4,116,706 | 9/1978 | Previte | 106/727 |
| 4,168,984 | 9/1979 | Ray | 106/728 |
| 4,204,877 | 5/1980 | Moorer et al. | 106/90 |
| 4,338,048 | 7/1982 | Murphy et al. | 405/261 |
| 4,495,228 | 1/1985 | Cornwell | 427/385.5 |
| 4,909,849 | 5/1990 | Funderbunk | 106/90 |

FOREIGN PATENT DOCUMENTS

| | | |
|---|---|---|
| 2600563 | 7/1977 | Fed. Rep. of Germany . |
| 3636659 | 4/1987 | Fed. Rep. of Germany . |
| 2227240 | 4/1973 | France . |
| 55-32800 | 4/1980 | Japan . |
| 58-185458 | 10/1983 | Japan . |
| 63-319235 | 12/1988 | Japan . |
| 8908627 | 9/1989 | PCT Int'l Appl. . |
| 697455 | 11/1979 | U.S.S.R. . |
| 910548 | 3/1982 | U.S.S.R. . |
| 1648920 | 5/1991 | U.S.S.R. . |

OTHER PUBLICATIONS

"Nuclear magnetic resonance measurements of the effect of some concrete additives on cement hydration" Kocuvan et al. (1979) Silikattechnik 30(1), 22–25.

"Effect of surfactant additives on cement hydration" Grochyan et al. (1976-Russian) Fzv. Vyssh. Uchebn. Zaved, Khim Teckhnol., 19(9), 1465–6.

"Polymer-containing cement composition" Shearing-GB1192864 (May 20, 1970).

"Dental Cement Composition" Ono et al. JP 60-181004 vol. 10, No. 28 (Abs No.) (Published Feb. 4, 1986).

*Concrete Admixtures Handbook* Ramachandran (1984) pp. 564–565, Noyes Publications.

Saasen, A., Rafoss, E., Behzadi, A., "Experimental Investigation of Rheology and Thickening Time of Class G. Oil Well Cement Slurries Containing Glycerin", *Cement and Concrete Research*, vol. 21, pp. 911–916, 1991., Pergamon Press.

European Search Report, European Patent Office, Ref. No. N.66071 SB, Application No. 93300546.4–, Applicant: W. R. Grace & Co.-Conn. Date: Apr. 15, 1993.

*Primary Examiner*—Karl Group
*Assistant Examiner*—Paul Marcantoni
*Attorney, Agent, or Firm*—Nicholas P. Triano, III; William L. Baker

[57] ABSTRACT

New set-accelerating admixtures for hydraulic cement compositions are disclosed. These admixtures incorporate known set accelerators and certain low molecular weight glycols, e.g., glycerol and ethylene glycol, are found to be surprisingly effective in decreasing the initial set time of hydraulic cements, mortars, and concretes, and are advantageous as reduced-temperature set-accelerators.

14 Claims, No Drawings

HYDRAULIC CEMENT SET-ACCELERATING ADMIXTURES INCORPORATING GLYCOLS

This is a continuation of co-pending application Ser. No. 07/827,196 filed on Jan. 28, 1992, now abandoned.

FIELD OF THE INVENTION

This invention relates to improvements in set-accelerating admixtures for hydraulic cement compositions such as mortars, grouts and concretes. More particularly the invention relates to novel set-accelerating admixtures and methods for set-acceleration employing the addition of certain low molecular weight glycols, e.g., glycerol and ethylene glycol.

BACKGROUND OF THE INVENTION

Set accelerators are used when it is necessary to work with hydraulic cement compositions at freezing or near-freezing temperatures. The rate of hydration of Portland cement, for example, is very dependent on temperature, such that, at lower temperatures, Portland cement compositions will often harden at a rate slower than desired unless the hardening process is accelerated. In addition to accelerating the set, it is desirable to also attain an increase in the rate of early strength development at normal or low temperatures. This reduces curing and protection periods necessary to achieve specified strengths in concrete. Some techniques for accelerating the set are: increasing the proportion of cement in the mix, heating the mix, and using chemical admixtures that act on the components of the mix to increase the rate at which the cement paste sets.

Several chemical set accelerators are well-known. They include alkali hydroxides, silicates, fluorosilicates, calcium formate, sodium chloride, calcium chloride, and calcium nitrate and calcium nitrite.

Calcium chloride is widely used because it is easy and inexpensive to produce and its effects on hydraulic cement are predictable and well-documented. However, like sodium chloride, it has the disadvantage of corroding steel. Thus, it can cause the corrosion of steel reinforcing bars in concrete. Other drawbacks of calcium chloride use include reduced compressive strength at later ages, reduced response to air entrainment, and blotching of hardened concrete surfaces (*Concrete Admixtures*, Dodson: Van Nostrand Reinhold, 1990).

It is thus an object of this invention to provide new set-accelerating admixtures which reduce the set time of hydraulic cement compositions at lower temperatures, without inducing or promoting corrosion of steel reinforcement. Further objects of the invention are to provide methods for preparing such cement compositions and to provide methods for reducing the set time of hydraulic cement compositions.

SUMMARY OF THE INVENTION

This invention is directed toward new hydraulic cement set-accelerating admixture compositions, to cement compositions containing such admixtures, and to methods for preparing said cement compositions. The admixture compositions comprise a set accelerator component and a $C_2$ to $C_6$ glycol component present in an amount effective to increase the set acceleration properties of the set-accelerator component. The invention further relates to a method of making a hydraulic cement composition comprising adding to a cement composition comprising a hydraulic cement binder, a set-accelerating component, and a $C_2$ to $C_6$ glycol component in an amount effective to increase tile set-acceleration properties of the set-accelerator component, and to a cement composition comprising a hydraulic cement binder, a set-accelerating component, and a $C_2$ to $C_6$ glycol component present in an amount effective to increase the set acceleration properties of the set-accelerator component.

DESCRIPTION OF THE INVENTION

It has been found that admixtures comprising a set-accelerating compound and certain low molecular weight glycols are surprisingly effective in reducing the set time of hydraulic cement compositions. Such admixtures are also found to be quite effective at lower working temperatures, i.e., below about 50° F. It appears that these low molecular weight glycols increase the set-acceleration properties of a set-accelerating compound. Additionally, admixtures of this invention may be formulated in such a way as to produce a composition that will inhibit corrosion in steel reinforcing bars commonly imbedded in cement compositions.

The term "glycol" as used herein is intended to mean two to six carbon, i.e., "$C_2$ to $C_6$", aliphatic di- and trihydric alcohols. Glycols suitable for use in the invention are those such as ethylene glycol, propylene glycol, and glycerol. Other compounds meeting the above definition will be apparent to those skilled in the art. Until now these compounds have not been known to have any set-accelerating qualities, i.e., they have been used primarily as grinding aids and set retarders. For this reason these compounds were not seen as having any value as part of a set-accelerating admixture. As such it was surprising to the inventors that a glycol as described herein could be used with a set-accelerating compound to significantly increase the set acceleration of a cement composition over that obtained by the addition of the set accelerator alone to the cement composition. Thus this invention utilizes the glycol component to give the set acceleration of the cement composition containing the set accelerator a desired "boost."

The term "cement composition" as used herein refers to pastes, mortars and concrete compositions comprising a hydraulic cement binder. The above terms are terms of art. Pastes are mixtures composed of a hydraulic cement binder, for example, Portland cement, either alone or in combination with fly ash, silica fume or blast furnace slag, and water; mortars are pastes additionally including fine aggregate, and concretes are mortars additionally including coarse aggregate. Such compositions may additionally include other admixtures such as defoaming agents, air-entraining or detraining agents, set retarders, water reducing agents, superplasticizers, and other components known to those in the art for altering properties of the composition. The cement compositions of this invention are formed by mixing required amounts of certain materials, e.g., a hydraulic cement, water, and fine or coarse aggregate, as may be applicable for the particular cement composition being formed.

The set-accelerating component may be any compound which, when added to a cement composition (as described above), reduces the amount of time required for the cement composition to harden. For example, an alkali or alkaline earth metal salt which is a salt of an organic or inorganic acid may be employed. Although the following list is not meant to be limiting, examples of these compounds are alkali or alkaline earth metal nitrate, nitrite, and formate; alkali or alkaline earth metal salts of Group VII halogen and pseudohalogen acids, such as alkali or alkaline earth metal chloride, bromide, iodide, thiocyanate, thiosulfate and perchlorate; and alkali or alkaline earth metal aluminates, silicates, and hydroxides, e.g., sodium hydroxide. Calcium salts are particularly advantageous, especially calcium nitrate, calcium chloride, and calcium formate, and calcium nitrite.

It is also feasible to use a mixture of alkali or alkaline earth metal salts, for example, a mixture of calcium nitrate and calcium nitrite. Any ratio of the salts used may be employed; in a preferred calcium nitrate/calcium nitrite mixture, a range of weight ratios of from about 1:3 to 3:1 may be used. The inventors have found that such an admixture, using a calcium nitrate/calcium nitrite mixture as the set-accelerator component, is beneficial in inhibiting corrosion in steel reinforcing bars commonly imbedded in cement compositions.

If the set-accelerating component and glycol component are added to the cement composition separately, the glycol may be added, generally, in percent solids on solids ("% s/s"), in the range of about 0.05% s/s to 1.0% s/s (based on the weight of hydraulic cement binder in the cement composition), with a preferred range of about 0.1% s/s to 0.75% s/s, such concentrations being generally those which provide the desired boost in acceleration. The set-accelerating component may be added in the usual amounts necessary for set-acceleration, but generally in a range of from about 0.05% s/s to about 4.0% s/s. (Note that through the use of a glycol component of the invention, it is also possible to reduce the amount of set-accelerator component normally required for a certain level of set acceleration, because of the better set-acceleration provided by the combination of the glycol and the set-accelerator.)

However, the inventors find it is preferable to combine the glycol component and the set-accelerating component in desired amounts before addition to a cement composition, so only one composition need be metered out and added to the cement composition. This is a simpler and more precise method than adding each component separately and reduces the opportunity for error in dispensing the correct formulation. If the set-accelerating component and glycol component are to be mixed before addition to a cement composition, the glycol component and the set-accelerating component may be combined in any proportion effective to give the desired results. Generally, the amount of the glycol in the mixture may range from about 0.5 to 40 weight % (based on the combined weight of glycol component and accelerator component), and preferably from about 2 to 30 weight %.

An admixture of the invention should be mixed into a hydraulic cement composition in an amount effective to allow the acceleration desired. The specific amount of the admixture can be readily determined and will depend on the cement composition, the ratio of components of the composition, and the degree of acceleration desired. The admixture is generally added to a cement composition in an amount which, as noted above, provides a glycol concentration of from about 0.05% s/s to 1.0% s/s, preferably from about 0.1% s/s to 0.75% s/s, such concentrations being generally those which provide the desired boost in acceleration.

The admixtures of this invention can be added to cement compositions in any conventional manner familiar to those in the art. The admixture should be substantially uniformly mixed with the cement composition.

The following examples are given for illustrative purposes only. Unless otherwise indicated, all parts and proportions are by weight.

EXAMPLE 1

An admixture was prepared consisting of calcium nitrate and calcium nitrite, in a 2:1 ratio, in water. The total % solids of the admixture was 42.6%.

EXAMPLE 2

An admixture of the invention was prepared consisting of calcium nitrate, calcium nitrite, and glycerol, in a 2:1:1 ratio (by weight), in water. The total % solids of the admixture was 45%.

EXAMPLE 3

The admixtures prepared in Examples 1 and 2 were each added individually to mortars prepared using a Type I-II Portland cement, sand, and a water to cement ratio of 0.45. A blank mortar, containing no admixture, was also prepared. Each mortar was prepared by combining 4500 g of sand, 900 g of $H_2O$, and 2000 g of cement in a Hobart mixer until homogeneous. A sufficient amount of the admixture solutions of Examples 1 and 2 was added to provide an admixture solids concentration of 0.5% s/s, and 2.0% s/s, based on the weight of hydraulic cement in the admixture. Set times were measured in accordance with ASTM C403. The test was performed at 55° F.

Table 1 presents the data, which demonstrate, at different addition rates, the utility of adding a glycol component of the invention (glycerol), to improve the performance of a set-accelerating compound, in this case a mixture of calcium nitrate and calcium nitrite.

EXAMPLE 4

An admixture of the invention was prepared consisting of calcium nitrate, calcium nitrite and glycerol, in a proportion of 60:16:24 (by weight), in water. The total % solids of the admixture was 45%.

EXAMPLE 5

The admixture prepared in Example 4 was added to mortars prepared using three different Type I-II Portland cements ("Cements 1, 2, and 3"), sand, and a water to cement ratio of 0.45. Blank mortars, containing no admixture, were also prepared with each cement. Each mortar was prepared by combining 4500 g of sand, 900 g of $H_2O$, and 2000 g of cement in a Hobart mixer until homogeneous. A sufficient amount of the admixture solution of Example 4 was added to provide an admixture solids concentration of 2.5% s/s, based on the weight of hydraulic cement in the admixture. Set times were measured in accordance with ASTM C403. The test was performed at 40° F.

Table 2 presents the results, which show the set time performance with the three cement types. The data demonstrate the cold-temperature performance of a set accelerating cement admixture of the invention.

The preceding description of the invention has been intended to illustrate rather than limit the invention. The inventors intend that various modifications or changes be made within the scope of the appended claims without departing from the spirit of the invention.

TABLE 1

| Admixture of Example # | Initial Set Time (hr) | Change In Initial Set Time (hr) |
|---|---|---|
| blank | 11.08 | — |
| 1 (at 0.5% s/s) | 8.94 | 2.14 |
| 2 (at 0.5% s/s) | 7.97 | 3.11 |
| 1 (at 2.0% s/s) | 5.05 | 6.03 |
| 2 (at 2.0% s/s) | 3.74 | 7.34 |

TABLE 2

| Admix. of Example # | Initial Set Time (hr) | | | |
|---|---|---|---|---|
| | Cement 1 | Cement 2 | Cement 3 | Avg. |
| blank | 9.50 | 11.40 | 10.18 | 10.36 |
| 4 | 7.57 | 8.57 | 8.33 | 8.16 |

What is claimed is:

1. An admixture for reducing the set time of a cement composition which contains a hydraulic cement binder, said admixture comprising
    a) a set accelerating amount of a set-accelerator component selected from the group consisting of alkali or alkaline earth metal nitrate, nitrite, and formate; alkali or alkaline earth metal salts of Group VII halogen and pseudohalogen acids; alkali or alkaline earth metal aluminates, silicates, and hydroxides; and mixtures thereof; and
    b) a $C_2$ to $C_6$ glycol component which is defined as a two to six carbon aliphatic di- and trihydric alcohol, present in an amount effective to increase the set acceleration properties of the set-accelerator component.

2. The admixture of claim 1 wherein the amount of said glycol component in said admixture is in the range of from about 0.05 to 40 weight %, based on the combined weight of glycol component and accelerator component in said admixture.

3. The admixture of claim 1 wherein the amount of said glycol component in said admixture is in the range of from about 2.0 to 30 weight %, based on the combined weight of glycol component and accelerator component in said admixture.

4. The admixture of claim 1 wherein said set-accelerating component is selected from the group consisting of calcium nitrate, calcium nitrite, and mixtures thereof.

5. A cement composition comprising a hydraulic cement binder and
    a) a set accelerating amount of a set-accelerator component selected from the group consisting of alkali or alkaline earth metal nitrate, nitrite, and formate; alkali or alkaline earth metal salts of Group VII halogen and pseudohalogen acids; alkali or alkaline earth metal aluminates, silicates, and hydroxides; and mixtures thereof; and
    b) a $C_2$ to $C_6$ glycol component which is defined as a two to six carbon aliphatic di- and trihydric alcohol, in an amount effective to increase the set acceleration properties of the set-accelerator component.

6. The composition of claim 5 wherein the amount of said glycol component is in the range of from about 0.05% s/s to 1.0% s/s, based on the amount of hydraulic cement binder in said composition...

7. The composition of claim 5 wherein the amount of said glycol component is in the range of from about 0.1% s/s to 0.75% s/s, based on the weight of hydraulic cement binder in said composition.

8. The composition of claim 5 wherein said set-accelerating component is selected from the group consisting of calcium nitrate, calcium nitrite, and mixtures thereof.

9. A method for making a cement composition which contains a hydraulic cement binder, said method comprising adding to said cement composition
    a) a set accelerating amount of a set-accelerator component selected from the group consisting of alkali or alkaline earth metal nitrate, nitrite, and formate; alkali or alkaline earth metal salts of Group VII halogen and pseudohalogen acids; alkali or alkaline earth metal aluminates, silicates, and hydroxides; and mixtures thereof; and
    b) a $C_2$ to $C_6$ glycol component which is defined as a two to six carbon aliphatic di- and trihydric alcohol, in an amount effective to increase the set acceleration properties of the set-accelerator component.

10. The method of claim 9 wherein the amount of said glycol component is in the range of from about 0.05% s/s to 1.0%, s/s, based on the weight of hydraulic cement binder in said composition.

11. The method of claim 9 wherein the amount of said glycol component is in the range of from about 0.1% s/s to 0.75%, s/s, based on the weight of hydraulic cement binder in said composition.

12. The method of claim 9 wherein said set-accelerating component is selected from the group consisting of calcium nitrate, calcium nitrite, and mixtures thereof.

13. A corrosion-inhibiting, set-accelerating admixture for reducing the set time of a cement composition which contains a hydraulic cement binder, said admixture comprising
    a) a set accelerating amount of a set-accelerator component comprising a mixture of alkaline earth metal nitrate and alkaline earth metal nitrite; and
    b) a $C_2$ to $C_6$ glycol component, present in an amount effective to increase the set acceleration properties of the set-accelerator component.

14. The admixture of claim 13 wherein said glycol component is glycerol and said set-accelerating component is a mixture of calcium nitrate and calcium nitrite.

* * * * *